No. 640,197. Patented Jan. 2, 1900.
A. M. HEWLETT.
PIPE COUPLING.
(Application filed Mar. 10, 1899.)

(No Model.)

Witnesses.
Wm. M. Rheem
H. O. Monson

Inventor:
Alfred M. Hewlett
by Bond, Adams, Pickard & Jackson
Atty's.

UNITED STATES PATENT OFFICE.

ALFRED M. HEWLETT, OF KEWANEE, ILLINOIS.

PIPE-COUPLING.

SPECIFICATION forming part of Letters Patent No. 640,197, dated January 2, 1900.

Application filed March 10, 1899. Serial No. 708,528. (No model.)

*To all whom it may concern:*

Be it known that I, ALFRED M. HEWLETT, a citizen of the United States, residing at Kewanee, in the county of Henry and State of Illinois, have invented certain new and useful Improvements in Pipe-Couplings, of which the following is a specification, reference being had to the accompanying drawings.

My invention relates to pipe-couplings; and its object is to provide pipe-couplings especially adapted for use in water, steam, and similar pipes in which the connections have to be frequently broken. In pipe-couplings for this purpose as heretofore constructed it has been the habit to make the two members of the coupling and the coupling-ring all of the same metal. In case this is wrought-iron or steel or similar metal the parts are liable to become rusted, so that when it is desired to take them apart they are so fastened together by the action of the oxidation of the metal that it is difficult to uncouple them, and when uncoupled the action of uncoupling is apt to so injure the parts that if put together again the joint is not a tight and secure one. Moreover, when made of wrought-iron or steel it is necessary to provide a gasket between the abutting ends of the members within the coupling-ring in order to prevent leakage, and this gasket is apt also to gather around it an accumulation of rust, which destroys the efficiency of the coupling. In case both members are made of brass or some similar material not liable to oxidation either a gasket has to be used between the abutting ends or they have to be carefully ground into one another, so as to form a water or steam tight connection, which operates well enough on the first connection; but on screwing them together again they are apt to be unevenly worn, so that an imperfect joint which is not impervious to water or steam is apt to be caused.

The object of my invention is to provide a new and improved coupling which remedies the defects referred to; and this object I accomplish in the manner and by the means hereinafter described and claimed, reference being made to the accompanying drawings, in which—

Figure 1:
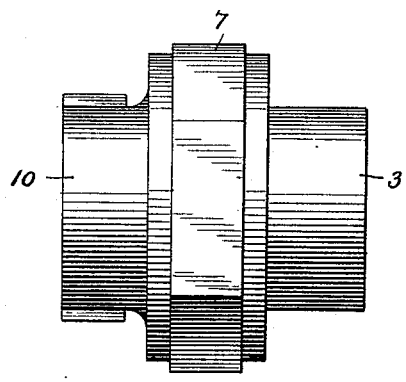
Figure 2:
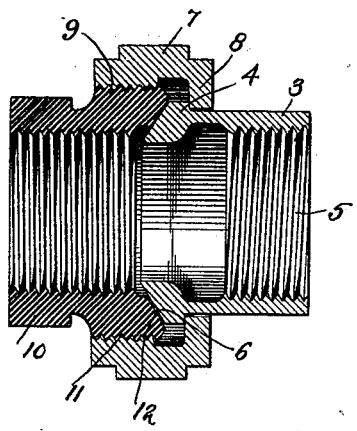

Figure 1 is a side elevation of the coupling; Fig. 2, a longitudinal cross-section through the same.

3 indicates one of the members of the coupling, which is made of wrought-iron or steel or some similar relatively hard material. The member 3 is formed with a circumferential shoulder 4 and is provided with an interior screw-thread 5, adapted to screw upon the end of a pipe. The end of the member 3 opposite the screw-thread is provided with a beveled surface 6, as is best shown in Fig. 2.

7 indicates a coupling-ring which is provided with a shoulder 8, adapted to bear upon and support the circumferential shoulder 4 of the member 3 in such a way as to permit the member 3 to turn freely within the coupling-ring. The interior surface of the coupling-ring 7 is provided with screw-threads 9, as is shown in Fig. 2.

10 indicates the second member of the coupling, which is made of a substantially non-oxidizable metal relatively softer than that of which the other member 3 is made. The material of which the member 10 is made is preferably brass, although it may be made of copper, bronze, tin, aluminium, or some other similar metal. The member 10 is screw-threaded interiorly, so as to adapt it to be screwed upon the end of a pipe and is provided upon its outer surface, where it enters into the coupling-ring 7, with a screw-thread 11, adapted to engage with and screw into the screw-threaded portion 9 of the coupling-ring 7.

The end of the coupling 10 which enters the coupling-ring 7 is provided with an inwardly-sloping beveled surface 12, adapted to engage with and fit closely upon the beveled surface 6 of the member 3. By constructing these two members one of a relatively harder and the other of a relatively softer metal and providing them with the opposing beveled surfaces above described they may be cast and finished in a machine to the proper shape, and then by screwing them together, as hereinafter described, the action of the beveled surface of the harder member upon the corresponding beveled surface of the softer one will cause the beveled surface upon the softer member to grind to and fit closely upon its opposing member and form a perfect joint by the action of screwing them together in the coupling without the necessity of separately and accurately grinding them beforehand.

In putting the coupling together the member 3 is inserted into the ring 7, so that the circumferential shoulder 4 is supported upon the shoulder 8 of said ring. The member 10 is thereupon screwed into the ring 7 until the beveled surface of the two rings closely fit against one another, and by the grinding action above described a tight joint is produced. When it is desired to separate the members, the ring 7 is rotated in the proper direction, turning upon the member 3 and unscrewing the member 10 by the rotation of the ring 7. As the ring 7 is preferably made of wrought-iron or steel and the member 10, which screws into it, of brass or some similar substantially non-oxidizable material, the member 10 and the ring 7 will not be fastened together by the rusting or oxidation of the parts.

What I claim as my invention, and desire to secure by Letters Patent, is—

1. In a pipe-coupling, the combination with a member made of relatively hard material and constructed for attachment to the end of a pipe, said member being provided with an integral bearing-surface, of a second coupling member composed of relatively softer and substantially non-oxidizable metal and having formed integrally therewith a bearing-surface arranged to bear against the bearing-surface of the member formed of harder metal, and a coupling-ring also formed of relatively hard metal and detachably connected to the member of softer metal, said ring operating when rotated to bring the bearing-surfaces of the two members into close contact, substantially as described.

2. In a pipe-coupling, the combination of a member constructed to be secured to the end of a pipe and composed of a relatively hard material, said member being formed with a bearing-surface and a circumferential, external shoulder, a coupling-ring also composed of relatively hard metal and provided with a shoulder arranged to bear on the shoulder of said member, and a second member composed of relatively softer and practically non-oxidizable material constructed to be screwed into said coupling-ring and having a bearing-surface formed integrally therewith, said ring when rotated operating to draw the said bearing-surfaces into close contact, substantially as described.

3. In a pipe-coupling, the combination with a coupling member of relatively hard material and constructed for attachment to the end of a pipe, said member being provided with an integral bearing-surface, of a coupling-ring rotatably arranged on said coupling member, said ring being also composed of a relatively hard material and interiorly screw-threaded, and a second coupling member of relatively softer and substantially non-oxidizable material and externally screw-threaded to engage the internal screw-threads of the coupling-ring, said softer member being provided with a bearing-surface arranged to closely bear against the bearing-surface on the harder member when the coupling-ring is screwed up, substantially as described.

ALFRED M. HEWLETT.

Witnesses:
ELMO I. LEWIS,
H. W. TRASK.